（12） United States Patent
Huang et al.

(10) Patent No.: US 8,339,116 B2
(45) Date of Patent: Dec. 25, 2012

(54) DC/DC CONVERTER INCLUDING ULTRASONIC FEATURE FOR USE WITH LOW QUIESCENT CURRENTS

(75) Inventors: Congzhong Huang, Plano, TX (US); Haito Hu, Sunnyvale, CA (US); Sicheng Chen, McKinney, TX (US)

(73) Assignee: Intersil Americas Inc., Milpitas, CA (US)

( * ) Notice: Subject to any disclaimer, the term of this patent is extended or adjusted under 35 U.S.C. 154(b) by 341 days.

(21) Appl. No.: 12/855,999

(22) Filed: Aug. 13, 2010

(65) Prior Publication Data

US 2011/0227549 A1    Sep. 22, 2011

Related U.S. Application Data

(60) Provisional application No. 61/316,226, filed on Mar. 22, 2010.

(51) Int. Cl.
*G05F 1/575* (2006.01)
*G05F 1/618* (2006.01)
(52) U.S. Cl. ........................................ 323/285; 323/284
(58) Field of Classification Search .................. 323/224, 323/282, 284, 285, 351, 223, 225, 271
See application file for complete search history.

(56) References Cited

U.S. PATENT DOCUMENTS

| | | | |
|---|---|---|---|
| 6,677,738 B1 * | 1/2004 | Hesse | 323/284 |
| 7,279,875 B2 * | 10/2007 | Gan et al. | 323/282 |
| 7,804,285 B2 * | 9/2010 | Nishida | 323/284 |

* cited by examiner

*Primary Examiner* — Gary L Laxton
(74) *Attorney, Agent, or Firm* — Howison & Arnott, L.L.P.

(57) ABSTRACT

A buck voltage converter comprises an upper switching transistor connected between an input voltage node and a phase node. The upper switching transistor turns on and off responsive to a first drive signal. A lower switching transistor is connected between the phase node and ground. The lower switching transistor turns on and off responsive to a second drive signal. An inductor is connected the phase node and an output voltage node. Control circuitry generates the first drive signal and the second drive signal responsive to a feedback voltage monitored at the output voltage node and a phase at the phase node. In a pulse frequency mode voltage of operation the control circuitry turns off the upper switching transistor and turns on the lower switching transistor responsive to a determination that a predetermined period of time has occurred since a detection of a phase switch at the phase node and turns off both the upper switching transistors and the lower switching after the lower switching transistor has been turned on for a second predetermined period of time.

20 Claims, 5 Drawing Sheets

DC/DC CONVERTER INCLUDING ULTRASONIC FEATURE FOR USE WITH LOW QUIESCENT CURRENTS

CROSS-REFERENCE TO RELATED APPLICATIONS

This application claims priority to U.S. Provisional Application No. 61/316,226, filed on Mar. 22, 2010, entitled DC/DC CONVERTER INCLUDING ULTRASONIC FEATURE FOR USE WITH ULTRA LOW QUIESCENT CURRENT, which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
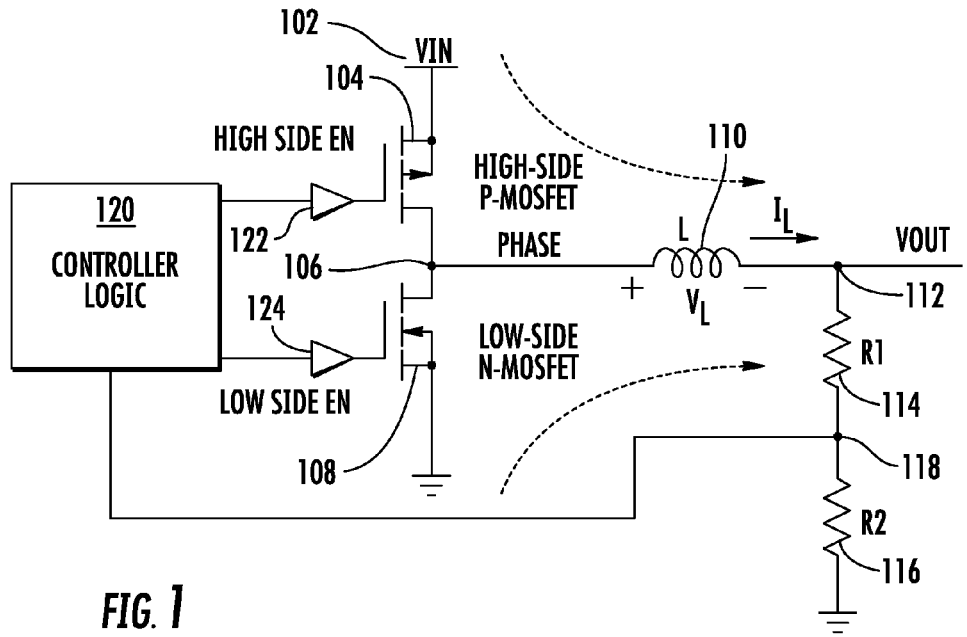
FIG. 1 is a functional block diagram of a typical buck converter.

Referring now to the drawings, wherein like reference numbers are used herein to designate like elements throughout, the various views and embodiments of a DC/DC voltage converter including an ultrasonic feature enabling low quiescent current operation are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a functional block diagram of a typical buck DC/DC converter. An input voltage $V_{IN}$ is applied at node 102 through a high side P-channel transistor 104 having its source/drain path connected between node 102 and a phase node 106. A low side N-channel switching transistor 108 has its drain/source path connected between node 106 and ground. An inductor 110 is connected between the phase node 106 and an output voltage node 112 that provides the output voltage $V_{OUT}$. A resistor divider comprised of a resistor 114 and resistor 116 monitors the output voltage $V_{OUT}$. The resistor 114 is connected between node 112 and node 118. Resistor 116 is connected between node 118 and ground.

Control logic 120 is connected to node 118 of the resistor divider to monitor the output voltage $V_{OUT}$ via a feedback voltage from node 118. The control logic 120 uses the feedback voltage to generate drive control signals to driver circuits 122 and 124, respectively. The driver circuits 122 and 124 drive the high side switching transistor 104 and low side switching transistor 108, respectively. The control logic 120 drives the switching transistors 104 and 108 in one of a pulse frequency modulation mode of operation and a pulse width modulation mode of operation.

The pulse width modulation mode of operation is normally used within medium and high load applications as this provides the highest efficiencies for the buck converter in these load conditions. In operating in light loads, the pulse frequency modulation (PFM) mode of operation is utilized. This is due to the fact that in portable applications efficiencies especially at light loads have a significant impact on the battery life. Normal PWM mode of operation can optimize efficiencies at mid to full load of operation but this is at the expense of light load efficiency. By utilizing the PFM mode of operation at light loads, high efficiencies may be maintained across the entire load range of a device. Pulse frequency modulation mode may also be introduced in DC/DC converters where the quiescent current consumption is critical. In PFM mode, the switching frequency varies based upon the different load current conditions. Under light or no load conditions, the switching frequency is much slower compared to the constant pulse width modulation (PWM) approach. This saves the switching losses which are proportional to the switching frequency to improve the overall quiescent current consumption.

For low quiescent DC/DC converters, the PFM mode of operation achieves high efficiencies under light load conditions. However, under light or no load conditions, the PFM switching frequency could go into the audible frequency band of approximately 20 Hz to 20 kHz. This frequency within the audible frequency band introduces audible noises within some audio related applications. Thus, there is a need to limit the switching frequencies of the buck converter to higher than 20 kHz even at low and no load conditions. However, when the converter is operating in the PFM mode and switching is forced to be at 20 kHz or higher frequencies, there is a concern that the quiescent current consumption will be higher. Thus, there is a trade off between achieving higher quiescent currents and avoiding the switching frequencies within the audible band which will introduce undesirable noise in certain applications. Thus, a scheme which can achieve minimized low quiescent current while enabling the buck converter to operate above 20 kHz can remove the possibility of undesirable audible frequencies. Existing techniques to this problem involve using high side MOSFET switching require more quiescent current than is desired. High side MOSFET switching comes with energy from $V_{IN}$ and increases switching losses.

Figure 2:
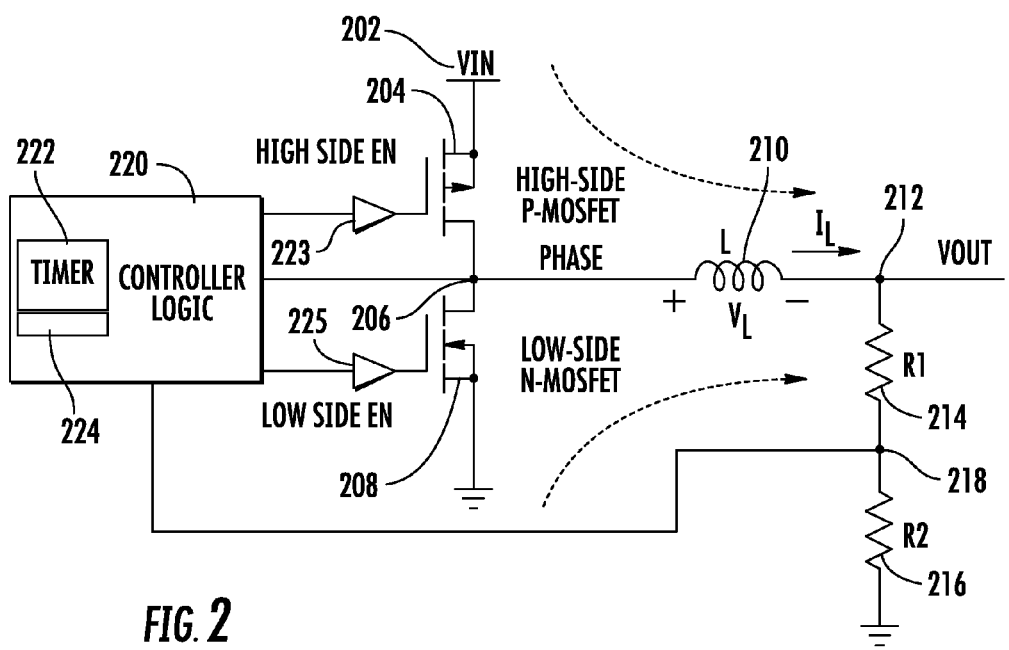
FIG. 2 illustrates a functional block diagram of a buck converter including the ultrasonic feature for use with ultra low quiescent currents of the present disclosure.

Referring now to FIG. 2, there is illustrated an embodiment of the buck converter of the present disclosure including an ultrasonic frequency feature enabling the buck converter to maintain its switching frequency above an audible frequency range while minimizing quiescent current. While the present embodiment is described with respect to a buck converter, the system is applicable to other synchronous DC/DC voltage converters. An input voltage $V_{IN}$ is applied at node 202 through a high side P-channel transistor 204 having its source/drain path connected between node 202 and a phase node 206. A low side N-channel switching transistor 208 has its drain/source path connected between node 206 and ground. An inductor 210 is connected between the phase node 206 and an output voltage node 212 that provides the output voltage $V_{OUT}$. A resistor divider comprised of a resistor 214 and resistor 216 monitors the output voltage $V_{OUT}$. The resistor 214 is connected between node 212 and node 218. Resistor 216 is connected between node 218 and ground.

Control logic 220 is connected to node 218 of the resistor divider to monitor the output voltage $V_{OUT}$ via a feedback voltage from node 218. The control logic 220 uses the feedback voltage to generate drive control signals to driver circuits 223 and 225, respectively. The driver circuits 223 and 225 drive the high side switching transistor 204 and low side switching transistor 208, respectively. The control logic 220 drives the switching transistors 204 and 208 in one of a pulse frequency modulation mode of operation and a pulse width mode of operation.

The control logic 220 additionally includes a timer circuit 222 and ultrasonic logic 224 enabling the control logic 220 to maintain the switching frequency of the high side transistor 204 and the low side switching transistor 208 outside of the audible frequency range while minimizing quiescent current. The ultrasonic logic 224 within the control logic 220 controls the operation of the DC/DC buck converter such that when the converter is in the pulse frequency modulation (PFM) mode, the phase node switching frequency is changing based upon the loading conditions on the output voltage node 212. The switching frequency may be below 20 kHz in some modes of operation. This causes the operation of the circuit illustrated in FIG. 1 to fall into the audible frequency band of operation between 20 Hz and 20 kHz.

The ultrasonic logic 224 of the controller logic 220 works in conjunction with a timer circuit 222 within the controller logic 220 in order to prevent the switching frequency from operating in the audible frequency range. The frequency of the timer circuit 222 is set to 20 kHz or faster. The controller logic 220 via the ultrasonic logic 224 monitors the phase node 206 to determine each time the phase of the phase node switches. Each time the phase node switches phases, the timer circuit 222 is initiated. If there is no additional phase switching before the expiration of the period of time monitored by the timer circuit 222 (in one embodiment this may be 50 microseconds or less), the control logic 220 via the ultrasonic logic 224 will turn on the low side switching transistor 208 for a predetermined duration of time. In one embodiment this predetermined period of time may be approximately 80 nanoseconds.

During the "on" time of the low side switching transistor 208, the current through the inductor 210 will go negative, and the voltage at the phase node 206 will approach the ground voltage level. After the predetermined period of time, both the low side switching transistor 208 and the high side switching transistor 204 are turned off. The negative current within the inductor 210 will pass through the body diode of the high side switching transistor 204 and the voltage at the phase node 206 will approach the input voltage $V_{IN}$. Thus, the phase node voltage will swing from ground to $V_{IN}$ and acts in a manner consistent with normal PFM switching. However, since the high side switching transistor 204 is not turned on during this operation, there are no switching losses associated with the high side switching transistor 204. By implementing the circuit in this manner, the quiescent current consumption is maintained at the lowest possible level while still maintaining the switching frequency of above 20 kHz or higher at the phase node 206 in order to avoid operation of the circuit falling within the audible frequency band. Thus, the low side switching transistor 208 is turned on/off without unnecessarily turning on/off the high side switching transistor 204 in ultrasonic PFM operation. This saves switching losses while maintaining switching frequency at the phase node 206 above 20 kHz.

Figure 3:
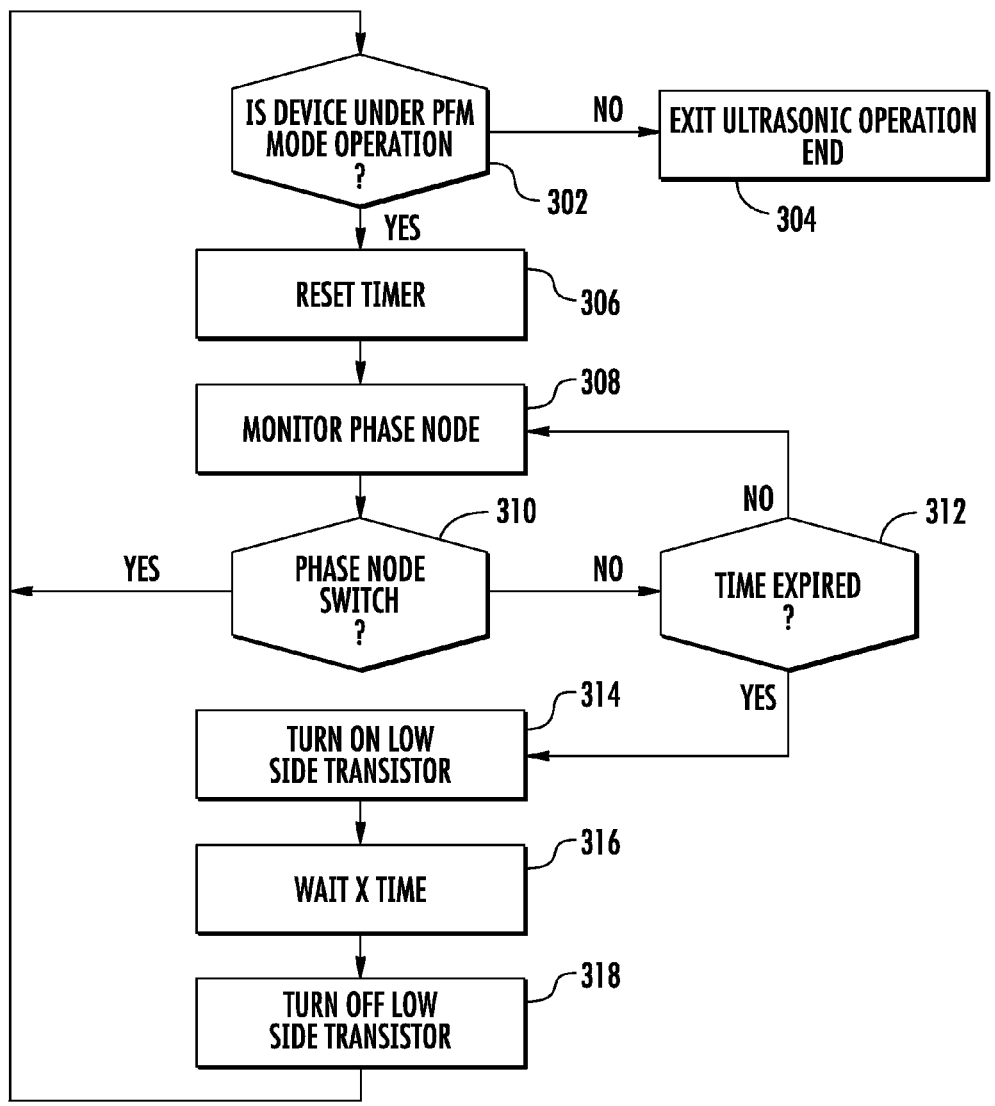
FIG. 3 is a flow diagram describing the operation of the buck converter including the ultrasonic feature of FIG. 2.

Referring now to FIG. 3, there is illustrated a flow diagram describing the operation of the buck converter using the ultrasonic logic 224 and associated timer circuitry 222 within the controller logic 220. Inquiry step 302 determines if the device is in the PFM mode of operation. If not in the PFM mode, the device ends ultrasonic operation at step 304. When the device is in PFM mode, the timer circuit 222 is reset to begin tracking the predetermine time period at step 306. The phase node 206 is again monitored at step 308 to detect a further phase switch. If a further phase switch is detected at inquiry step 310, control passes back to step 302. If a further phase switch at the phase node 206 is not detected, inquiry step 312 determines whether the timer period has expired. If the timer period has not expired, control passes back to step 308 to continue monitoring the phase at the phase node. If inquiry step 312 determines that the timer period has expired, the low side switching transistor 208 is turned on at step 314. The control logic 220 waits a selected period of time (for example, 80 nanoseconds) to leave the low side switching transistor turned on at step 316. During this period of time, the inductor current will go negative and the phase node voltage will approach the ground voltage.

After expiration of the predetermined period of time at step 316, the low side switching transistor 208 is turned off and high side switching transistor 204 remains off at step 318. This causes the negative current within the inductor 210 to go through the body diode of the high side switching transistor 204, and the voltage at the phase node approaches the input voltage $V_{IN}$. Thus, the phase node voltage will swing from ground to the input voltage and act like a normal PFM switch. However, since the high side switch is not turned on during this operation, there are no switching losses associated with the high side switch thus maintaining the quiescent current consumption at a lowest possible level while the switching frequency remains above 20 kHz.

Figure 4:
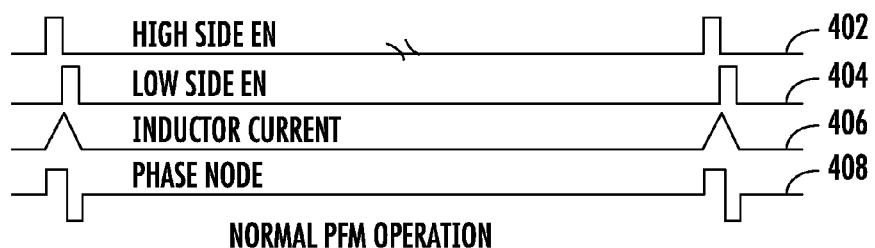
FIG. 4 illustrates the operation of the buck converter in PFM mode not using the ultrasonic feature.
Figure 5:
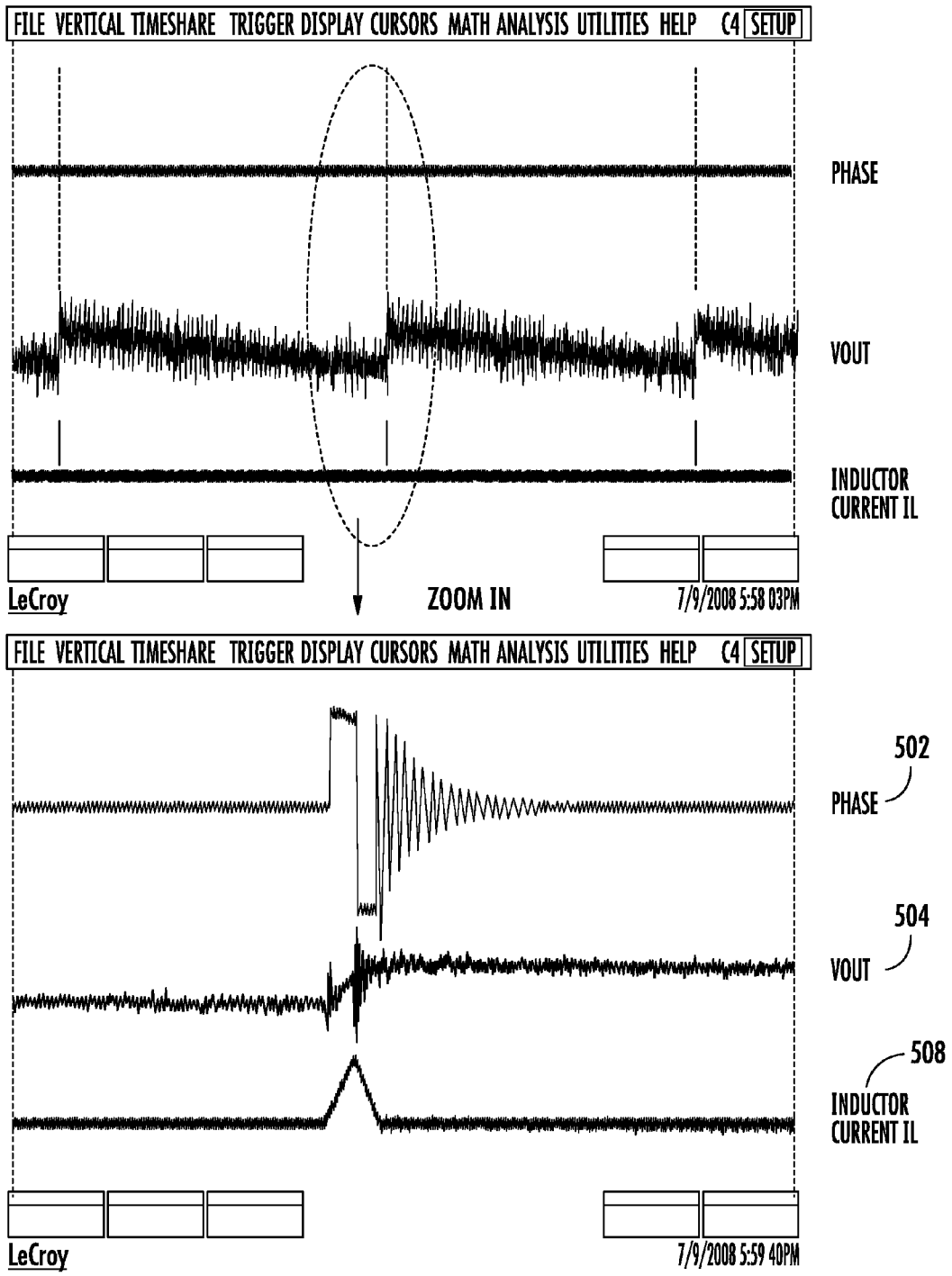
FIG. 5 illustrates various waveforms within a buck converter that is operating without the ultrasonic feature.

Referring now to FIG. 4, there is illustrated the operation of the high side gate drive enable signal 402 that is applied to the gate of high side switching transistor 204, the low side enable drive signal 404 for driving the gate of low side switching transistor 208, the inductor current 406 through inductor 210, and the phase node voltage 408 at the phase node 208. FIG. 4 illustrates the PFM mode of operation of the buck converter of FIG. 1 that does not include the ultrasonic feature. Referring now also to FIG. 5, there is illustrated the PFM mode of operation within the circuit of FIG. 1 and illustrates the waveforms for the phase 502, the output voltage $V_{OUT}$ 504 and the inductor current 508.

Figure 6:
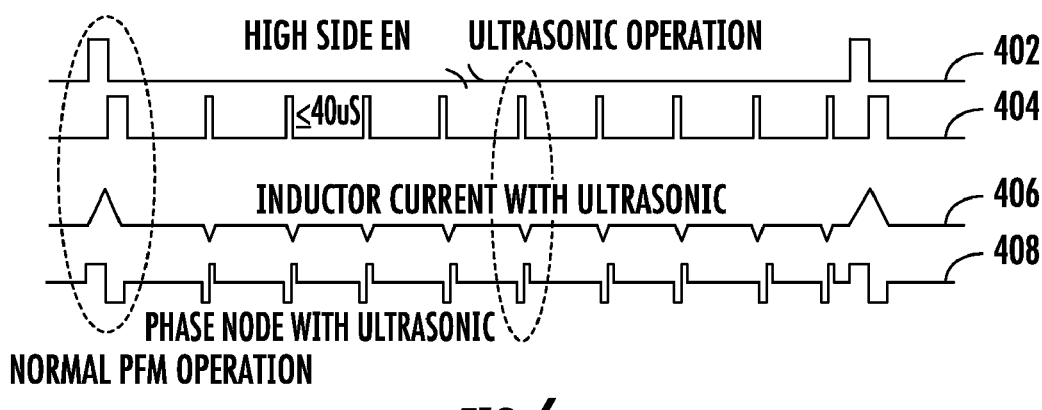
FIG. 6 illustrates the operation of a buck converter in the PFM mode using the ultrasonic feature.
Figure 7:
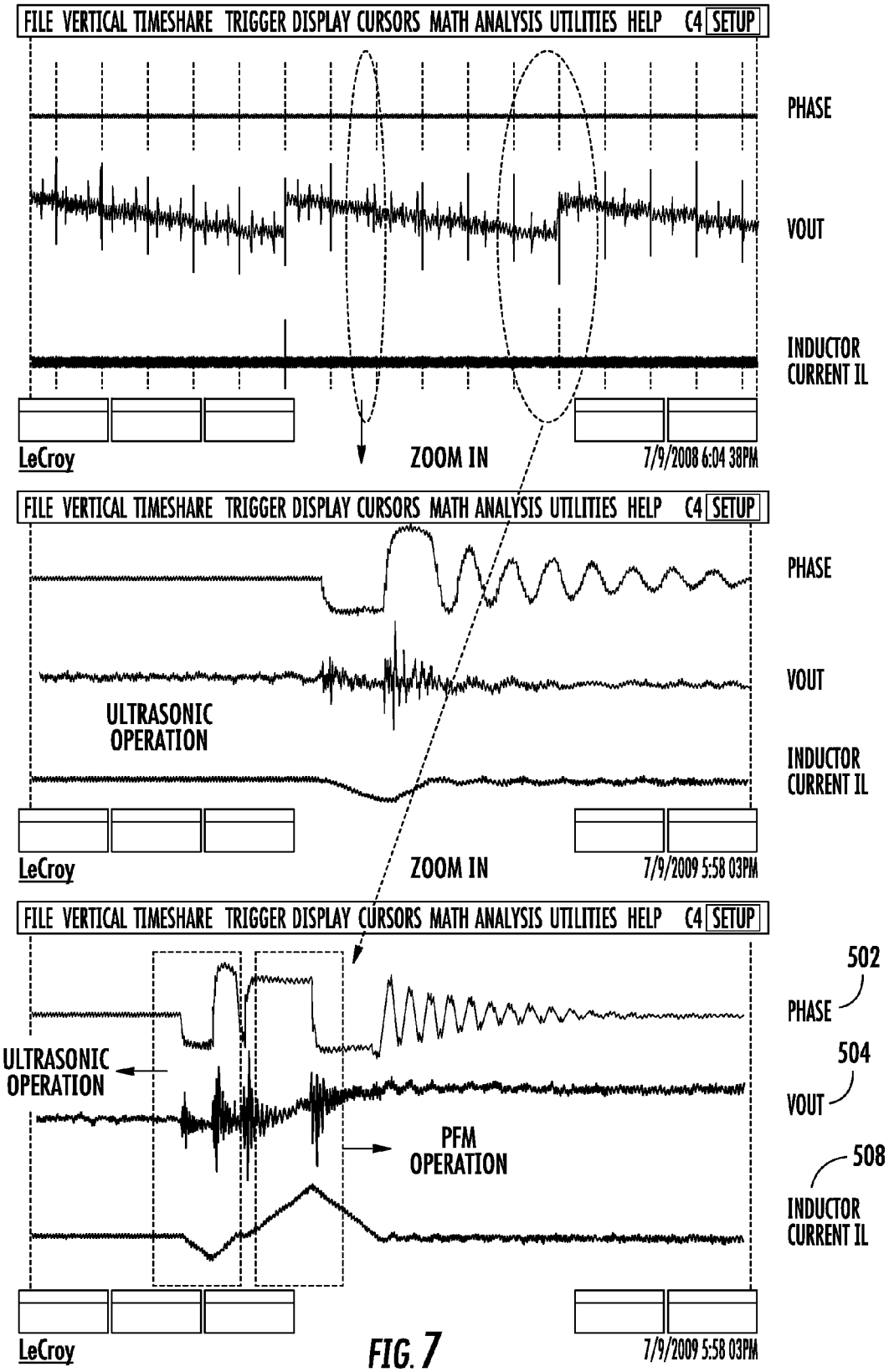
FIG. 7 illustrates various waveforms of a buck converter that is operating using an ultrasonic feature.

Referring now to FIG. 6, there is illustrated the high side enable signal 402, low side enable signal 404, inductor current 406 and phase node phase 408 for a device operating with the ultrasonic feature. As can be seen, the low side enable signal 404 is turned on a number of times for a time period of less than 40 microseconds each time a phase node change is detected at the phase node signal 408. The ultrasonic frequency implementation within the buck converter only turns on the low side switching transistor for a certain duration of time within a certain time period (in the described embodiment, about 80 nanoseconds for every 50 microseconds or less). The high side switching transistor will be turned off during the ultrasonic operation. This is the best way to implement the ultrasonic feature while keeping the quiescent current low and at a high efficiency. Thus, the circuit keeps the switching frequency higher than the audio band and minimizes quiescent current consumption which minimizes power losses and improves overall circuit efficiency. FIG. 7 illustrates various waveforms of a buck converter that is operating using the ultrasonic feature described herein above.

It will be appreciated by those skilled in the art having the benefit of this disclosure that this DC/DC converter including ultrasonic feature for use with low quiescent currents provides a converter with minimal quiescent current while preventing operation in an audible frequency range. It should be understood that the method and control technique of the disclosure can be applied to other types of synchronous DC/DC converters and the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A buck voltage converter, comprising:
   an upper switching transistor connected between an input voltage node and a phase node, the upper switching transistor turning on and off responsive to a first drive signal;
   a lower switching transistor connected between the phase node and ground, the lower switching transistor turning on and off responsive to a second drive signal;
   an inductor connected between the phase node and an output voltage node;
   control circuitry for generating the first drive signal and the second drive signal responsive to a feedback voltage monitored at the output voltage node and a phase voltage at the phase node; and
   wherein in a pulse frequency mode of operation the control circuitry turns off the upper switching transistor and turns on the lower switching transistor responsive to a determination that a predetermined period of time has occurred since a detection of a phase voltage switch at the phase node and turns off the lower switching transistor after the lower switching transistor has been turned on for a second predetermined period of time.

2. The buck voltage converter of claim 1, further including a timer for determining the predetermined period of time.

3. The buck voltage converter of claim 2, wherein the timer initiates tracking of the predetermined period of time responsive to detection of the phase voltage switch at the phase node.

4. The buck voltage converter of claim 1, further including driver circuitry for generating the first drive signal and the second drive signal responsive to the control circuitry.

5. The buck voltage converter of claim 1, further including a resistor divider circuit for generating a feedback voltage to the controller responsive to an output voltage at the output voltage node.

6. The buck voltage converter of claim 1, wherein a switching frequency of the phase node remains above 20 kHz.

7. A buck voltage converter, comprising:
   an upper switching transistor connected between an input voltage node and a phase node, the upper switching transistor turning on and off responsive to a first drive signal;
   a lower switching transistor connected between the phase node and ground, the lower switching transistor turning on and off responsive to a second drive signal;
   an inductor connected between the phase node and an output voltage node;
   a timer for determining a predetermined period of time;
   control circuitry for generating control signals responsive to a feedback voltage monitored at the output voltage node, the predetermined period of time determined by the timer and a phase voltage at the phase node;
   driver circuitry for generating the first drive signal and the second drive signal responsive to the control signals; and
   wherein in a pulse frequency mode operation the control circuitry turns off the upper switching transistor and turns on the lower switching transistor responsive to a determination that the predetermined period of time has occurred since a detection of a phase voltage switch at the phase node and turns off the lower switching transistor after the lower switching transistor has been turned on for a second predetermined period of time.

8. The buck voltage converter of claim 7, wherein the timer initiates tracking of the predetermined period of time responsive to detection of the phase voltage switch at the phase node.

9. The buck voltage converter of claim 7, further including a resistor divider circuit for generating a feedback voltage to the controller responsive to an output voltage at the output voltage node.

10. The buck voltage converter of claim 7, wherein a switching frequency of the phase node remains above 20 kHz.

11. A method for controlling operation of a synchronous DC/DC converter, comprising the steps of:
   generating an output voltage responsive to an input voltage within the synchronous DC/DC converter;
   monitoring a phase voltage at a phase node of the synchronous DC/DC converter;
   detecting when the phase voltage at the phase node switches;
   determining if a predetermined period of time expires before occurrence of a second phase voltage switch at the phase node after occurrence of a first phase voltage switch at the phase node;
   turning on the lower switching transistor for a second predetermined period of time responsive to a determination that the predetermined period of time has expired; and
   turning off the lower switching transistor after the lower switching transistor has been turned on for the second predetermined period of time.

12. The method of Claim 11 further including the step of resetting a timer monitoring the predetermined period of time responsive to the second phase voltage switch occurring prior to the expiration of the predetermined time period.

13. The method of claim 11, wherein the step of controlling further comprises the step of maintaining the switching frequency of the phase node above an audible frequency range.

14. The method of claim 11, wherein the step of controlling further comprises the step of controlling the on and the off state of the lower switching transistor and the upper switching transistor in the pulse frequency mode of operation.

15. The method of claim 11, wherein the step of determining further comprises the step of initiating a timer measuring the predetermined period responsive to the first phase voltage switch.

16. The method of claim 11, wherein synchronous DC/DC converter further comprises a buck voltage converter.

17. A synchronous DC/DC converter, comprising:
   a main switching transistor connected to a first input voltage node and a phase node, the main switching transistor turning on and off responsive to a first drive signal;
   a synchronous rectifier switching transistor connected to the phase node and to an output voltage node, the synchronous rectifier switching transistor turning on and off responsive to a second drive signal;
   an inductor connected between the phase node and a second input voltage node;
   a timer for determining a predetermined period of time;

control circuitry for generating control signals responsive to a feedback voltage monitored at the output voltage node, the predetermined period of time determined by the timer and a phase voltage at the phase node;

driver circuitry for generating the first drive signal and the second drive signal responsive to the control signals; and wherein in a pulse frequency mode operation the control circuitry turns off the main switching transistor and turns on the synchronous rectifier switching transistor responsive to a determination that the predetermined period of time has occurred since a detection of a phase voltage switch at the phase node and turns off the synchronous rectifier switching transistor after it has been turned on for a second predetermined period of time.

18. The synchronous DC/DC converter of claim 17, wherein the timer initiates tracking of the predetermined period of time responsive to detection of the phase voltage switch at the phase node.

19. The synchronous DC/DC converter of claim 17, wherein a switching frequency of the phase node remains above 20 kHz.

20. A method for controlling operation of a buck voltage converter, comprising the steps of:

generating an output voltage responsive to an input voltage within the buck voltage converter;

monitoring a phase voltage at a phase node of the buck voltage converter;

detecting when the phase voltage at the phase node switches;

determining if a predetermined period of time expires before occurrence of a second phase voltage switch at the phase node after occurrence of a first phase voltage switch at the phase node;

turning on the lower switching transistor for a second predetermined period of time responsive to a determination that the predetermined period of time has expired; and turning off the lower switching transistor after the lower switching transistor has been turned on for the second predetermined period of time.

* * * * *